United States Patent [19]
Chalupnik et al.

[11] Patent Number: 4,841,224
[45] Date of Patent: Jun. 20, 1989

[54] GAP WIDTH PROBE AND METHOD

[75] Inventors: James D. Chalupnik; Joseph L. Garbini; Jens E. Jorgensen, all of Seattle, Wash.

[73] Assignee: Washington Technology Center, Seattle, Wash.

[21] Appl. No.: 119,748

[22] Filed: Nov. 10, 1987

[51] Int. Cl.$^4$ ............................................. G01R 27/26
[52] U.S. Cl. ..................................... 324/61 P; 33/783; 324/61 R
[58] Field of Search ................. 324/61 R, 61 P, 60 C, 324/60 CD, 207, 208; 361/181; 33/143 L, 147 N, 531, 542, 544; 340/870.37

[56] References Cited

U.S. PATENT DOCUMENTS

| | | |
|---|---|---|
| 4,160,204 | 7/1979 | Holmgren et al. |
| 4,178,692 | 12/1979 | Schultz ........................ 33/143 L X |
| 4,328,621 | 5/1982 | Benjamin . |
| 4,404,481 | 9/1983 | Ide et al. ..................... 324/60 CD X |
| 4,482,860 | 11/1984 | Risko .......................... 324/61 P |
| 4,489,495 | 12/1984 | Scheinecker ................ 33/143 L |
| 4,528,451 | 7/1985 | Petric et al. . |
| 4,538,069 | 8/1985 | Shambroom et al. . |
| 4,539,835 | 9/1985 | Shambroom et al. . |
| 4,572,000 | 2/1986 | Kooiman . |
| 4,649,752 | 3/1987 | Turner . |
| 4,668,912 | 5/1987 | Junker ......................... 324/220 |

FOREIGN PATENT DOCUMENTS

| | | |
|---|---|---|
| 863859 | 2/1982 | U.S.S.R. . |
| 8333605 | 12/1983 | United Kingdom . |

Primary Examiner—Reinhard J. Eisenzopf
Assistant Examiner—Robert W. Mueller
Attorney, Agent, or Firm—Christensen, O'Connor, Johnson & Kindness

[57] ABSTRACT

A probe for determining the thickness of an interface gap between two surfaces is disclosed. The probe includes an inflatable bladder, which can be inserted into a gap and inflated, such that the sides of the bladder contact the planes. A distance-measuring device is mounted within the cavity of the bladder and is suitable for measuring the distance between the sides of the bladder. Passive electrical circuitry for use as the distance-measuring device is also disclosed. Passive electrical circuitry has an electrical property that varies as the distance between the passive electrical elements varies. In the case of a probe utilizing capacitive circuitry, three relationally positioned measuring electrodes and a common electrode are mounted within the bladder cavity such that the measuring and common electrical are in facing relationship and move away from each other as the bladder is inflated. When the bladder is inflated with a dielectric fluid, the electrodes are pressed flat against the surfaces. Once the electrodes are separated, a value for the capacitance at each measuring electrode's position is obtained. The capacitance value is indicative of the distance between the surfaces. Two-dimensional gap taper information, as well as single-dimension thickness information, can thus be produced.

12 Claims, 3 Drawing Sheets

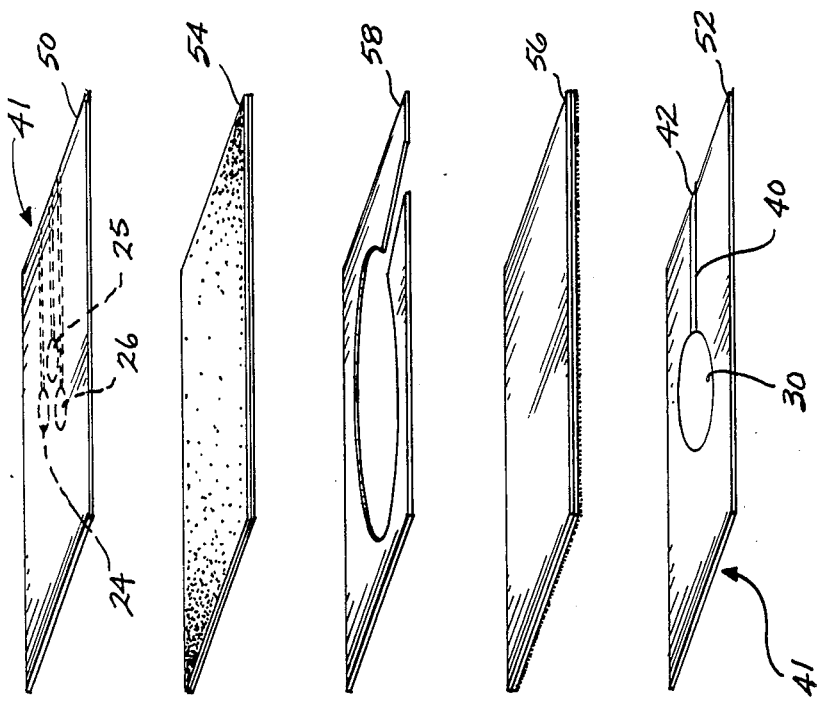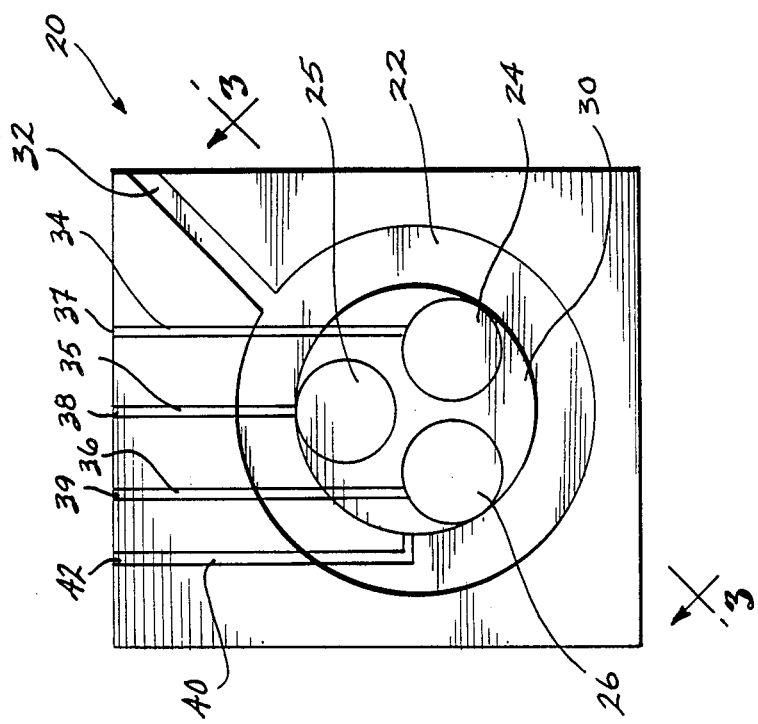

GAP WIDTH PROBE AND METHOD

TECHNICAL AREA

This invention relates to a device for measuring the distance between surfaces and, more particularly, to a probe and method for measuring the distance between narrowly separated surfaces and utilizing the distance information to determine the geometry of the gap formed by the surfaces.

BACKGROUND OF THE INVENTION

It is common engineering practice to design large assemblies with intentional gaps left between subassemblies to avoid interference and locked-in stresses in the final structure. Unintentional gaps are also formed due to lack of precise measurements. These gaps, referred to as shim gaps, whose surfaces may be nonparallel and irregular, are subsequently filled with shims that must be custom fitted to the gap in order to provide proper alignment and smooth load transfer. The quality of the shim used to fill the gap varies according to the requirements of the final structure. For example, in load-bearing joints, the shim material must match the physical characteristics of the parts to be joined. This means metal shims are required for metal structures, with the specific shim material depending on the application.

An additional problem encountered in attempting to measure a shim gap is that the clearance may be extremely limited and the range of variability very large, relatively speaking. In extreme cases, one could be called upon to measure a gap of 0.25 millimeter in one joint, and at the next joint measure a gap of 5 millimeters using the same gauge. Thus, ideally, a shim probe must be thin enough for insertion into an extremely thin gap, but capable of measuring a gap that is relatively large. This problem could be overcome by using probes with a variety of measurement range limitations. However, the use of more than one probe leads to inefficient production.

The range of tolerance can substantially affect the alignment and internal stress generation. This is an additional consideration in shim manufacturing. Suitable tolerances are determined by gap size and application. For example, for a shim gap ranging from 0.25 to 5 mm, an acceptable tolerance for airplane manufacture is generally ±0.1 mm.

Due to the number and variety of shim fittings that must be made in large structures, such as airplanes, an automated method of gauging the shim gap is preferable. For example, if the shims were to be produced by a numerically controlled machining operation, then the output from the gap measuring device could be provided in the form of an electrical signal that is manipulated by an appropriate computer interface to produce proper machine instructions. Such numerically controlled shim-producing machines exist and are in wide usage in the industry.

The age-old and still current practice is to hand fit shim blanks, i.e., pieces of suitable material in block or other three-dimensional geometric shape, to the particular gap by a cut-and-try procedure. The blanks are ready-cut to the desired pad shape from laminated sheets of the shim material. Layer after layer of the thin material is manually peeled off until the shim blank will slip into the gap. If too many layers are removed in this manner, the shim becomes useless for the given gap, and the cut-and-try procedure begins again with a new shim blank. The cut-and-try procedure is clearly subject to high material and labor costs.

Other gap-filling techniques measure the shim gap and manufacture a shim according to those measurements. Some assumptions about the characteristics of the gap are made in order to simplify this type of mechanical measuring of gap dimensions. Typically, in metal structures, the faces of the joining parts have been machine flattened. Thus, a shim gap in an assembly, such as an airplane, can be assumed to be defined by two surfaces that are generally planar. Additionally, each gap is assumed to be defined by only two planes.

In order to determine the measurements for a three-dimensional shim gap, the orientation of the surfaces defining the gap with respect to each other must be determined. This orientation can be described by the dimensions of the shim that would fill the gap space. A rigid body, or surface, in space has six degrees of freedom. In general, six values are thus required to describe the position and orientation of the body with respect to an arbitrary coordinate system. If one of the planes defining the shim gap is chosen as a reference plane, and a convenient point in that plane is the origin of a coordinate system, then the position and orientation of the other plane can be completely described with respect to the reference plane with a maximum of six measurements, the same six measurements that would define the shim. The orientation of the unknown plane is defined by angular rotations about an orthogonal axis perpendicular to the normal axis and, finally, a rotation about the normal. In practice, this last rotation is of no significance, thereby allowing the unknown plane to be adequately defined with only five measurements.

One prior art device for measuring shim gaps is a relatively large electromechanical tool. The tool includes a two-piece probe having lips that are suitable for insertion into the gap whose thickness is to be measured. The measuring portion of the device includes an electric motor coupled to the probe for moving the probe pieces apart, and a shaft angle encoder for measuring the separation between the tips of the probe. In addition to being an undesirably large and cumbersome hand tool, the device has the disadvantage of measuring the gap at a single point per insertion. Single-point measurement is undesirable because at least three gap measurements taken at very precisely located, spaced-apart positions are required in order to obtain all of the information needed to determine the planar profile of a shim. Not only is precise manual positioning expensive because it is time consuming, the multiple manual positioning of a single-point measuring device is more likely to result in errors than is the single manual positioning of a multiple-point measuring device. Additionally, mechanical devices are subject to inaccurate measurements and harm to the plane surfaces due to distortion in the surface caused by the force of the probe pieces.

Microwave, profilometer, and optical measurement devices have also been proposed to measure the thickness of interface gaps that need to be shimmed. As with the mechanical system described above, all of these proposals have the disadvantage of providing measurements at a single location per measurement. Because of the previously described difficulties associated with single-location measurement devices, it is difficult to utilize the information generated by such devices to control a machine tool system designed to automatically create a shim based on precise measurements information. In addition, many of the prior art gap-measuring devices are relatively bulky, making them unuseful when the gap is small or when the gap whose thickness is to be measured is located near adjacent structures.

This invention overcomes the drawbacks of existing shim gap measurement methods described above as well as others.

SUMMARY OF THE INVENTION

An apparatus and method for determining the thickness of an interface gap, i.e., a gap between two facing planar elements, is provided. The probe includes an inflatable bladder and a measuring device. When the bladder is inflated, thereby causing the sides of the bladder to move away from each other, the measuring device measures the distance between the sides. By expanding the bladder so that the sides of the bladder contact the surfaces defining the gap, the measuring device provides information related to the distance between the surfaces. This information is then used in the manufacture of properly fitting shims.

In a preferred embodiment the probe includes an inflatable bladder with an interior cavity which can be filled with a fluid of a known bulk electrical property, e.g., dielectric constant, resistivity, magnetic permeability. The walls of the bladder contain electrical circuitry that includes an electrode on each side of the bladder and electrical conductor pathways to connect the electrodes to detection circuitry. When the bladder is inflated, the combination of the electrodes and the fluid between them form a passive electrical element, e.g., capacitor, resistor, or inductor. When the bladder is inflated, the electrodes on the opposing sides of the cavity are pressed flat against the opposing surfaces of the gap. The electrical property: capacitance; resistance; or inductance, of the passive electrical element depends uniquely on the distance between the electrodes, and hence, on the distance between the surfaces of the gap. Each pair of opposed electrodes forms a sensor pair, which is capable of measuring the distance between the gap surfaces at the effective center of the electrode.

In accordance with another aspect of this invention, the capacitance between the electrodes is measured. The detection circuitry produces an electrical signal that is proportional to the capacitance of the electrode pairs. Thus, the electrical signal is related to the gap width at the location of the electrode pair. By mounting electrode pairs at three distinct points within the bladder, two-dimensional taper, as well as thickness, information is provided, since three pricisely positioned spaced-apart distance measurements are provided.

In accordance with further aspects of this invention, the passive electrical circuit includes a set of three measuring electrodes which are mounted on one side of the cavity, and a common electrode mounted on the opposite side. The three measuring electrodes are uniformly spaced from one another and connected by leads to the detection circuitry. Such a capacitance circuit has two desirable characteristics. First, the capacitance is not highly dependent upon the material of the bounding surfaces defining the gap. Second, electrodes for measuring the capacitance can be pressed flat against the surfaces of the gap when the bladder is inflated, thereby providing an accurate measurement of the distance between the surfaces.

In accordance with further aspects of this invention, a dielectric fluid, isopropanol, is used to inflate the bladder. A high dielectric constant is a desirable characteristic of the fluid used to inflate the device, in that the capacitance of the electrode pairs increases with an increase in the dielectric constant. The dielectric constant of isopropanol is approximately eighteen times that of air. Other desirable properties for the fluid are that it has a relatively low viscosity to enable rapid filling of the bladder cavity; it does not attack the material used to make the bladder; it is chemically stable; it is nonpolar; and its dielectric properties very negligibly with small levels of contamination.

In accordance with still other aspects of this invention, the probe is a laminate of thin layers of polyimide films and adhesives. The cavity portion of the bladder is provided by precutting the shape from the center adhesive in the laminate.

In accordance with another aspect of this invention, the electrodes and electrode leads are created by vapor deposition techniques. Additionally, a chrome layer between the electrodes and the polyimide film layer is used to protect the contact points between the leads and the detection circuitry.

In accordance with another aspect of this invention, an external ground for the passive electrical circuit is provided on both sides of the bladder.

As will be readily appreciated from the foregoing description, the invention provides a shim gap probe and method suitable for measuring the thickness of the gap between two planar elements. Because the probe is electronically based and includes connections for connecting the passive electrical circuit to external detection circuitry, the probe can be manufactured in relatively small size and can be utilized to measure the thickness of gaps located adjacent structural components.

BRIEF DESCRIPTION OF THE DRAWINGS

The foregoing and other advantages and features of this invention will become more readily appreciated as the same becomes better understood by reference to the following detailed description when taken in conjunction with the accompanying drawings, wherein:

FIG. 1 is a plan view of the bladder of the preferred embodiment of the invention;

FIG. 4 is a schematic view of a pressurization system suitable for inflating the bladder in accordance with the invention;

DESCRIPTION OF THE PREFERRED EMBODIMENT

Figure 2A:
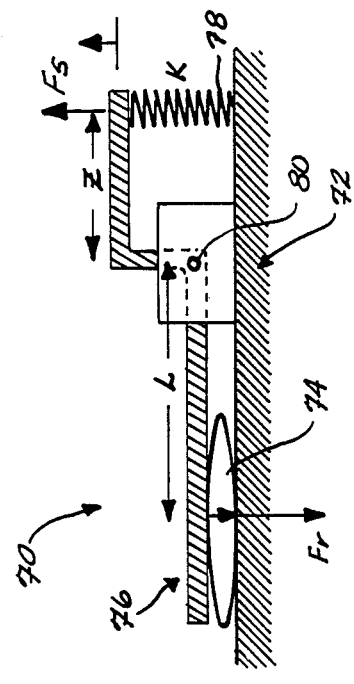
FIG. 2 is an exploded longitudinal side-elevational view of the laminate forming the bladder of the preferred embodiment of the invention illustrated in FIG. 1.

FIG. 1 illustrates a preferred embodiment of the probe of the present invention. The probe is shown in an uninflated state. The probe 20 includes bladder 22, measuring electrodes 24, 25, and 26, common electrode 30, and fill tube 32. In one preferred embodiment, the length of the probe is 2.0 inch, the width is one inch, and the thickness is 0.007 inch. The diameter of the bladder is nearly 1.0 inch. With these dimensions, a gap on the order of 0.25 mm to 5 mm can be measured.

Figure 3:
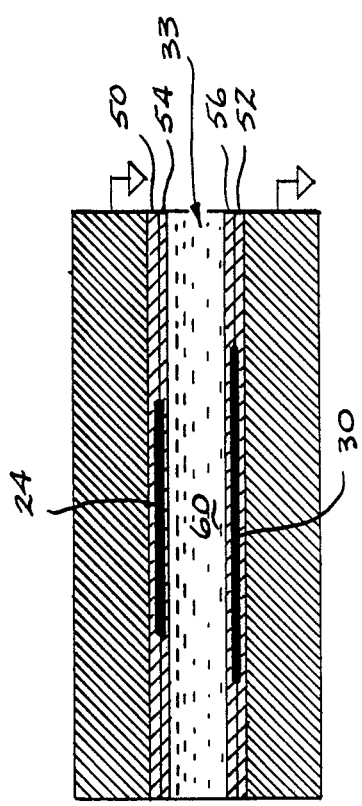
FIG. 3 is an enlarged, cross-sectional view along line 3—3 of FIG. 1.

The measuring and common electrodes are mounted on opposite sides of the interior of the bladder, i.e., the bladder cavity 33 shown in FIG. 3. Measuring electrodes 24-26 are connected to leads 34, 35, and 36, respectively. Leads 34-36 terminate in contact pads 37, 38, and 39, respectively. Common electrode 30 is connected to lead 40, which terminates in contact pad 42. For reasons to be discussed below, the area of common electrode 30 is calculated according to the maximum width of the gap to be measured. The dimensions and arrangement of the measuring electrodes will be discussed below. Measuring electrodes 24-26 are positioned in the cavity such that they are each opposed to common electrode 30. Preferably, no part of the measuring electrodes extends beyond the edge of the common electrode when viewed in a direction substantially normal to the planes containing the electrodes. Because of the small dimensions of the gaps to be measured by a probe with these dimensions, as the bladder is inflated, the common and measuring electrodes will maintain their relative positions, i.e., they will remain relatively parallel.

The preferred material for forming the electrodes and leads is gold, due to its superior conductivity, flexibility, and inertness. The preferred method for forming the electrodes is by conventional vapor deposition technique. Using this technique, the gold can be deposited at a thickness between 900 and 1500 Å on the probe material. These thicknesses have no adverse effect on the flexibility of the probe, and do not cause creasing, which would disturb the smooth surface of the probe.

The abrasion resistance of the electrodes and leads is improved by first depositing a thin layer, approximately 300 Å, of chromium on the mounting surface. This procedure is performed during the same vapor deposition process as used for the gold and is primarily useful in extending the life of the contact pads 37-39, and 42 at the ends of the leads 34-36, and 40. This is desirable, since the contact pads are the only exposed deposited material in the probe and are subject to abrasion when the probe is attached to detection circuitry. In addition to the electrodes and leads being produced by vapor deposition, it is preferable to deposit a thin layer of metal 41, as shown in FIG. 2, on the entire exterior of the probe to provide a fixed external ground plane.

The probe is preferably constructed of a polyimide film manufactured by Dupont under the trademark Kapton. Kapton film is transparent, durable, and manufactured in sheets as thin as 0.0003 inch. Kapton film can be bonded to itself or to other materials using acrylic sheet adhesives. The laminate resulting from the bonding between the adhesive and Kapton film is flexible and stable. A stronger specially conditioned form of Kapton, also manufactured by Dupong under the trademark Pyralux, is a film that has been prelaminated to an uncured adhesive layer. Standard Kapton film is used for the outer layers of the probe, while Pyralux film is used in the inner layers of the probe where strength of the lamination is critical.

FIG. 2 illustrates the layering of Kapton and Pyralux films in the construction of the probe. The outer layers of the probe are made up of Kapton film sheets 50 and 52. Prior to lamination, the electrodes are formed on the inner layers of the Kapton film, as illustrated by common electrode 30 and lead 40, and by measuring electrodes 24-26 and leads 34-36 shown in reference. The next interior layers are layers of Pyralux film 54 and 56, with their adhesive sides facing outward, i.e., contacting the outer layers 50 and 52. The electrodes and leads thus lie between the outer layers of Kapton film and the inner layers of Pyralux film. The inflatable interior cavity 33 and fill tube 32 are formed by cutting their shape out of a sheet of adhesive 58, which is then placed between the two layers of Pyralux film. The assembled probe is a laminate of two layers of 0.001-inch Kapton film, two layers of 0.002-inch Pyralux film and one layer of 0.001-inch adhesive, resulting in an uninflated thickness of 0.007 inch. When the probe is inflated, the highly stressed bonds formed by the layers of Pyralux film prevent delamination of the probe at the bladder edges.

FIG. 3 illustrates the desired positioning of a measuring electrode 24 above common electrode 30 when the probe is inserted into a gap and the cavity 33 is filled with dielectric fluid 60. As noted above, once inflated, the measuring and common electrodes continue to be relatively aligned. This alignment ensures sufficient interaction between the electrodes for the purpose of measuring the capacitance between them.

The preferred dielectric fluid 60 is isopropanol ($C_3H_8O$, 2-propanol), which is readily available, has a fairly high dielectric constant of 18.3, and is a biostat, which is a useful characteristic for preventing the growth of microorganisms within the fluid.

When the probe is not inflated, the dielectric fluid 60 is preferably held remote from theprobe in a pressure regulation system. As illustrated in FIG. 4, a pressurized system 70 is mounted on top of circuit housing 72. The pressurized system includes fluid reservoir 74, lever 76, and spring 78. The reservoir 74 is connected by a short length of tubing (not shown) to fill tube 32. The reservoir 74 is positioned between one end of the lever 76 and the housing so that when the lever is released, spring 78 expands to compress the reservoir by acting on lever 76 at fulcrum 80. The amount of fluid in the reservoir 74 is the amount necessary to fill bladder 22.

The specifications of the pressurization system 70 are controlled by the requirement that the electrodes, when the bladder 22 is expanded, must be flat against the surfaces of the gap. Because of the toughness of the probe material, the walls of the bladder 22 do not stretch appreciably when inflated within a gap. Instead, the center portion of the bladder extends outward until the gap surfaces are contacted, while the peripheral area becomes scalloped with wrinkles in order to accommodate the center expansion. When the center portion contacts the gap surface it becomes flat over an area that is termed the footprint. When the bladder is infalted, the electrodes 24-26, and 30 must be within the footprint formed by their respective sides. The size of the footprint is partially dependent upon the inflation pressure. In turn, the determination of the diameter and the separation of the measuring electrodes 24-26 are dependent upon the relationship between the footprint size and the pressure within the bladder cavity.

The pressure-to-footprint diameter relationship was determined empirically for a probe with the preferred dimensions using a gap of 0.090 inch, in order to determine the smallest acceptable footprint. Table 1 illustrates the relationship between the footprint diameter and the pressure.

TABLE 1

| Pressure [psi] | Diameter [inches] |
| --- | --- |
| .75 | .5 |
| 1.10 | .6 |
| 1.50 | .7 |
| 2.25 | .8 |
| 6.00 | .9 |
| 10.50 | 1.0 |

The table illustrates that the footprint diameter is dependent upon pressure up to approximately 2.25 psi. Above this value the diameter shows reduced sensitivity to pressure. Thus, 2.25 psi is taken to be the minimum acceptable operating pressure of the system, providing a maximum usable footprint diameter of 0.8 inch.

Maximum pressure loading of the bladder is also related to footprint size. The net load F applied by a foot print of diameter d at pressure P is:

$$F = P\frac{\pi d^2}{4} \qquad (1)$$

If the pressure is too high, there is a risk of distorting the gap, i.e., causing an indentation in the gap surfaces, and obtaining a false reading from the probe. If a minimum pressure of 2.25 psi is applied, with a footprint diameter of 0.8 inch, the load applied to the gap is 1.1 lbf. The maximum pressure occurs at the minimun gap width, 0.010 inch, in which case the bladder diameter is very close to 1.0 inch. Assuming an arbitrary upward load limit of 5 lbf, the maximum permissible pressure is 3.9 psi.

Maximum pressure loading requirements establish the operating parameters for the pressurization system. The equation relating to the force applied to the reservoir to produce a properly inflated bladder is found to be:

$$z^2 = \frac{2LF_r}{ky} \qquad (2)$$

The variables are as shown in FIG. 4. The force $F_r$ is the average load, applied to the center of reservoir 74. The convenient distance for L and a spring of suitable dimension and spring constant k, were determined empirically. In the preferred embodiment, L is equal to 2 inches and a 0.38-inch spring with a spring constant of 49 lbf per inch are used.

The geometric relationship governing the diameter of the electrodes according to the maximum footprint diameter is:

$$A = \frac{2\;3}{2+3}\left|\frac{D}{4} - \frac{C}{2\;3}\right| \qquad (3)$$

where:
A=measuring electrode diameter;
D=measuring electrode region diameter; and
C=separation of measuring electrodes.

Using this equation, an electrode diameter of 0.250 inch for each measuring electrode and a separation of 0.100 inch is used, requiring a flat region of 0.673 inch, which is safely within the footprint as determined above.

Figure 5:
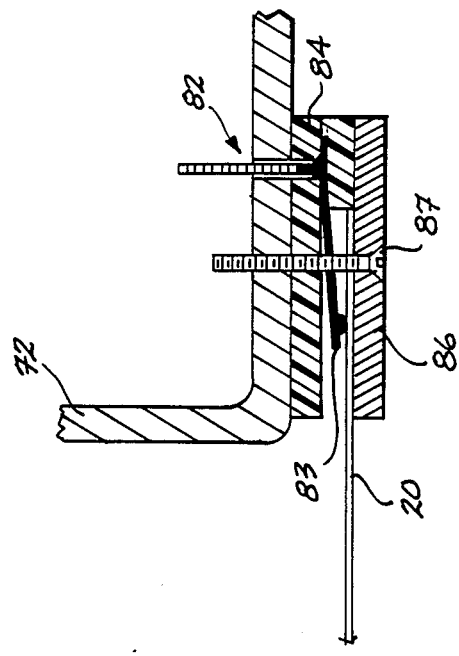
FIG. 5 is a section view of the connection system between the passive electrical circuit of the invention and detection circuitry.

FIG. 5 shows a cross section of one possible connection system between the probe and the detection circuitry, which is assumed to be located within circuit housing 72. In the connection system, insulated leads 82 from the detection circuitry pass through the bottom of circuit housing 72 to terminate in relay contacts 83. The connection between the insulated leads 82 and the relay contacts 83 is supported by fiberglass substrate 84 of the circuit housing 72. Although only one insulated lead-relay contact pair is illustrated, four such pairs are utilized by the connecting system. The contact pads 37–39 and 42 of the probe are then brought into close proximity with the relay contacts 83 and an external clamp 86 is tightened by screws 87 to establish and maintain electrical continuity between the relay contacts and the contact pads. The clamp is preferably made from brass to provide ground continuity between the circuit housing 72 and the probe exterior ground 41. This connection system eliminates the need to solder the probe to the detection circuit. The probe 20 can thus be replaced when necessary by simply removing the screws.

Once the probe 20 has been placed within a gap and the bladder 22 inflated, capacitance between the measuring electrodes 24–26 and the common electrode 30 is measured by the detection circuitry by conventional means. Capacitance is measured on the assumption that the two surfaces against which the electrodes are flattened are nearly parallel. This assumption allows a first order expression for the capacitance between two parallel electrodes to be used to determine the changes of capacitance across the bladder. Such an equation is:

$$C = \frac{k\epsilon_0 A_e}{t} \qquad (4)$$

where
k=dielectric constant of the material between the electrodes:
$\epsilon_o$=permittivity of free space;
$A_e$=area of each electrode; and
t=electrode spacing.

Neglecting edge effects, a first order expression for the net capacitance is:

$$C = C_s + C_k, \qquad (5)$$

where
$C_s$=measuring electrode capacitance, neglecting the offset due to the exterior ground plane; and
$C_k$=offset capacitance due to the ground plane. net capacitance can also be expressed as:

$$C = \frac{\epsilon_0 A_e}{\frac{t_a}{k_a} + \frac{t_k}{k_k}} + \frac{k_k \epsilon_0 (A_e + A_1)}{t_{kg}} \qquad (6)$$

wherein:
$t_a$=thickness of the dielectric fluid between the electrodes;
$t_k$=thickness of bladder material between the electrodes;
$t_{kg}$=thickness of bladder material between the electrodes and ground plane;
$k_a$=dielectric constant of the dielectric fluid;
$k_k$=dielectric constant of the bladder material;
$A_e$=area of each electrode; and
$A_1$=area of each measuring electrode lead.

$C_k$ is a constant value regardless of the gap size and is usually large relative to $C_s$ since the bladder material is necessarily thin. Thus, the value of $C_s$ is increased by selecting a dielectric fluid with a high value of $k_a$ and by having a large electrode area $A_e$.

Figure 6:
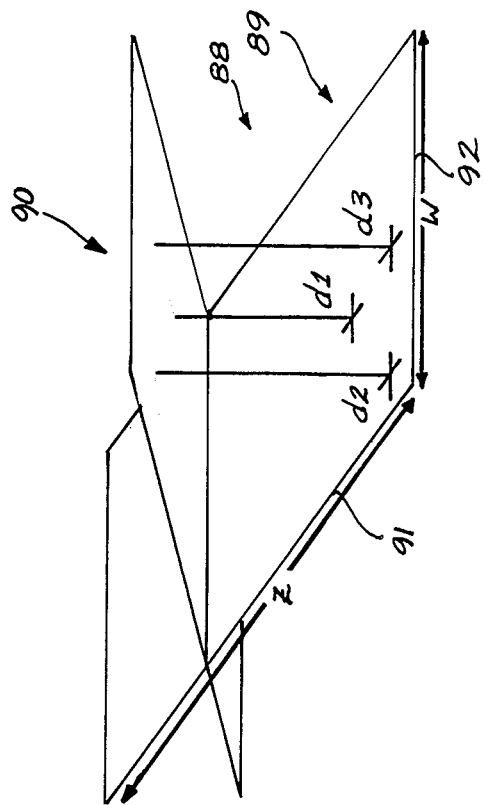
FIG. 6 is a graphic representation of a coordinate system describing a shim gap.

The probe provides three capacitance measurements proportional to measurements of gap width. The three measurements are taken at points whose positional interrelationship is known from the configuration of the probe. Two other positional measurements are necessary in order to determine the dimensions of the gap. FIG. 6 illustrates the various measurements to be taken within a gap 88 to determine the shim dimensions. Gap 88 is defined by reference plane 89 and unknown plane 90. A marked probe, i.e., a measuring stick (not shown), can be inserted along the line indicated by Z to give the depth along edge 91. The same measuring stick can measure width W along edge 92. By aligning the probe 20 with the corner formed by the intersection of edges 91 and 92, the coordinates of the measurements, $d_1$, $d_2$, and $d_3$, can be determined in the reference plane. This information provides sufficient information to determine the configuration in two orthogonal directions necessary to completely define a shim suitable for filling the gap.

The output of the detection circuitry is preferably electrical. Thus, the output can be directly connected to an automated milling machine. The capacitances of the electrode pairs are translated by the detection circuitry into dimensions to which the machine will cut shims.

While preferred embodiments of the invention have been illustrated and described, it will be appreciated that various changes can be made therein without departing from the spirit and scope of the invention. For example, larger or smaller probes with bladders and electrodes of various dimensions can be used to measure various ranges of gap width. Further, additional electrodes can be used to provide redundant measurements, or for determining gap dimensions at various positions in a gap defined by nonplanar or curved sides. Possible material substitutions include: mylar or polyester films for the Kapton film; and gas for the isopropanol. Additionally, the electrodes could be formed by sputtering techniques rather than vapor deposition. Finally, other types of passive electrical circuits or other distance measuring devices could be used within the probe. Consequently, the invention can be practiced otherwise than as specifically described herein., The embodiments of the inention in which a exclusive property or privilege is claimed are defined as follows:

1. A probe for use with detection circuitry for measuring the distance between two surfaces, comprising:
   an inflatable bladder having means for forming an interior cavity, said means including first and second bladder sides that may be substantially adjacent and parallel to one another when said bladder is uninflated such that the probe thickness is minimized, said bladder being suitable for insertion between the surfaces;
   means for inflating said cavity such that said first and second sides move away from one another, whereby said bladder can be inserted between the surfaces and inflated such that said sides are in contact with the surfaces; and
   distance measuring means for measuring the distance between said sides when said cavity is inflated, to thereby determine the distance between the surfaces.

2. The probe as claimed in claim 1, wherein said distance measuring means includes passive circuit means connected to said first and second bladder sides, said passive circuit means having an electrical property that varies as the distance between said first and second sides varies, and transmitting means for transmitting an indication of said electrical property to the detection circuitry, to thereby determine the distance between the surfaces.

3. The probe as claimed in claim 2, wherein said passive circuit means includes first and second planar electrodes connected to first and second sides of said bladder, respectively, and wherein said electrical property is the capacitance between said electrodes.

4. The probe as claimed in claim 2, wherein said passive circuit means includes a common electrode connected to said first side of said bladder and three measuring electrodes connected to said second side of said bladder, said electrical property is the capacitance between each of said measuring electrodes and said common electrode, and said transmitting means is a means for transmitting the capacitance between each of said measuring electrodes and said common electrode to the detection circuitry, whereby the distance between the surfaces is measured at three points.

5. The probe as claimed in claim 4, further comprising a means for determining the position of the probe relative to one of the surfaces, whereby the position of each of said measuring electrodes may be determined, to thereby determine the orientation of the surfaces relative to one another.

6. The probe as claimed in claim 5, wherein said means for inflating said cavity includes a dielectric fluid.

7. The probe as claimed in claim 6, wherein said dielectric fluid is isopropanol.

8. The probe as claimed in claim 7, wherein each side of said bladder is a laminate of polyimide films with thicknesses less than or equal to 0.003 inch.

9. A method for measuring the distance between two surfaces, comprising the steps of:
   positioning an inflatable bladder between the two surfaces, said bladder having means for forming an interior cavity, said means including first and second bladder sides that may be substantially adjacent and parallel to one another when said bladder is uninflated such that the probe thickness is minimized;
   inflating said cavity such that said first and second sides move away from one another, and are in contact with the surfaces; and
   measuring the distance between said first and second sides using a distance measuring means.

10. The method as claimed in claim 9, wherein said first and second sides of said bladder include first and second electrodes, respectively, and wherein said step of measuring the distance between said first and second sides comprises measuring the capcitance between said electrodes.

11. The method as claimed in claim 10, wherein said step of inflating said cavity includes the transfer of a dielectric fluid into said cavity.

12. A method for determining the orientation of two surfaces relative to one another, comprising the steps of:
   positioning an inflatable bladder between the two surfaces, said bladder having means for forming an interior cavity, said means including first and second bladder sides that may be substantially adjacent and parallel to one another when said bladder is uninflated such that the probe thickness is minimized;
   determining the position of said bladder relative to one of the planes;

inflating said cavity such that said first and second sides move away from one another, and are in contact with the surfaces; and measuring the distance between said first and second sides at three points using a distance measuring means, whereby the distance between the surfaces at three known points can be determined, to thereby determine the orientation of the surfaces relative to one another.

* * * * *